United States Patent
Pastor et al.

(10) Patent No.: US 9,604,649 B1
(45) Date of Patent: Mar. 28, 2017

(54) HANDS-OFF DETECTION ENHANCEMENT BY MEANS OF A SYNTHETIC SIGNAL

(71) Applicant: GM GLOBAL TECHNOLOGY OPERATIONS LLC, Detroit, MI (US)

(72) Inventors: Stephen R. Pastor, Farmington Hills, MI (US); Kenneth L. Oblizajek, Troy, MI (US); Jin-Woo Lee, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/042,883

(22) Filed: Feb. 12, 2016

(51) Int. Cl.
*B60W 40/09* (2012.01)
*B62D 15/00* (2006.01)

(52) U.S. Cl.
CPC ............ *B60W 40/09* (2013.01); *B62D 15/00* (2013.01); *B60W 2510/202* (2013.01); *B60W 2520/28* (2013.01)

(58) Field of Classification Search
CPC ........... B60W 40/09; B60W 2510/202; B60W 2520/28; B62D 15/00
USPC ...................................... 701/36, 41
See application file for complete search history.

(56) References Cited

U.S. PATENT DOCUMENTS

| | | | |
|---|---|---|---|
| 7,109,862 B2 * | 9/2006 | Braeuchle | B62D 1/06 340/561 |
| 8,744,682 B2 | 6/2014 | Oblizajek | |
| 8,880,287 B2 | 11/2014 | Lee | |
| 8,909,428 B1 * | 12/2014 | Lombrozo | B62D 15/025 701/41 |
| 9,096,262 B2 * | 8/2015 | Urhahne | B62D 15/00 |
| 2004/0167695 A1 * | 8/2004 | Braeuchle | B60Q 9/00 701/41 |
| 2009/0069981 A1 * | 3/2009 | Barthomeuf | B62D 5/0457 701/42 |
| 2010/0030429 A1 * | 2/2010 | Kuramori | B62D 1/046 701/42 |
| 2010/0131233 A1 * | 5/2010 | Deng | B60K 28/06 702/151 |
| 2010/0228417 A1 | 9/2010 | Lee | |
| 2012/0061169 A1 | 3/2012 | Oblizajek | |
| 2013/0124038 A1 * | 5/2013 | Naboulsi | G08B 21/06 701/36 |
| 2013/0317699 A1 * | 11/2013 | Urhahne | B62D 15/00 701/41 |

* cited by examiner

*Primary Examiner* — Tyler J Lee
(74) *Attorney, Agent, or Firm* — Reising Ethington, P.C.; Christopher Devries

(57) ABSTRACT

A method and system for determining whether a driver of a vehicle is in contact with a steering wheel of the vehicle is provided. One embodiment of the method includes the steps of generating a perturbation signal that causes vibration of the steering wheel and receiving a steering signal from a steering system sensor configured to provide an indication of at least one of a steering torque and a steering movement of a component of an electronic power steering system of the vehicle. The method further includes the steps of mixing the perturbation signal and the steering signal to produce a heterodyne signal and generating a driver contact signal indicative of whether the driver of the vehicle is in contact with the steering wheel of the vehicle, the value of the driver contact signal dependent on characteristics of the heterodyne signal relating to the perturbation signal.

24 Claims, 4 Drawing Sheets

HANDS-OFF DETECTION ENHANCEMENT BY MEANS OF A SYNTHETIC SIGNAL

FIELD

The present invention relates generally to a vehicle system. More specifically, the invention relates to a method and system for determining whether a driver of a vehicle is in contact with a steering wheel of the vehicle.

BACKGROUND

Modern vehicles are increasingly equipped with a variety of active safety systems, such as active cruise control systems and lane keeping systems, that are intended to supplement driver control of the vehicle when necessary to maintain safe operating conditions. One circumstance in which it may be desirable to enable or disable certain active safety systems occurs when the driver takes his or her hands off of the steering wheel of the vehicle.

Various methods and systems have been proposed to determine whether the driver's hands are in contact with the steering wheel. Some steering wheels have been equipped with capacitive or pressure sensors intended to detect the presence of the driver's hands on the steering wheel. The modified steering wheels are expensive, however, and can be unreliable. Other methods and systems have relied on measurements of steering torque and/or steering angle as indicators of the presence or absence of the driver's hands. These methods and systems cannot, however, account for circumstances in which steering is not normally required. For example, when a vehicle is travelling in a straight line at a relatively constant speed, the driver's hands may remain on the wheel, but not be involved in steering and therefore fail to generate the changes in steering torque/angle necessary to determine whether the driver's hands are, in fact, in contact with the steering wheel. Still other methods and systems introduce a vibration of the steering wheel and measure the response which differs depending on whether the driver's hands are on the steering wheel. It is desirable to produce very low levels of vibration during these assessments so that the vibration is not detected by the driver. This latter approach has proven difficult to implement, however, due to the excessive levels of vibration that need to be produced for adequate measurement and interpretation. In particular, if the introduced vibration is too small, it is difficult to directly identify a response dictated by the presence or absence of the driver's hands as opposed to a response resulting from other vehicle operating conditions. Increasing the level of vibration, however, will render the vibration detectable to the driver creating an undesirable distraction.

SUMMARY

According to one embodiment, there is provided a method for determining whether a driver of a vehicle is in contact with a steering wheel of the vehicle. The method includes the step of generating a perturbation signal that causes vibration of the steering wheel. The method further includes the step of receiving a steering signal from a steering system sensor configured to provide an indication of at least one of a steering torque and a steering movement of a component of an electronic power steering system of the vehicle. The method further includes the steps of mixing the perturbation signal and the steering signal to produce a heterodyne signal and generating a driver contact signal indicative of whether the driver of the vehicle is in contact with the steering wheel of the vehicle, a value of the driver contact signal dependent on characteristics of the heterodyne signal relating to the perturbation signal.

According to another embodiment, there is provided a method for determining whether a driver of a vehicle is in contact with a steering wheel of the vehicle. The method includes the steps of determining a speed of a road wheel of the vehicle and generating a perturbation signal that causes vibration of the steering wheel. A frequency of the perturbation signal is responsive to the speed of the road wheel of the vehicle. The method further includes the step of receiving a steering signal from a steering system sensor configured to provide an indication of at least one of a steering torque and a steering movement of a component of an electronic power steering system of the vehicle. The method further includes the step of generating a driver contact signal indicative of whether the driver of the vehicle is in contact with the steering wheel of the vehicle, a value of the driver contact signal dependent on characteristics of the steering signal relating to the perturbation signal.

According to another embodiment, a system is provided for determining whether a driver of a vehicle is in contact with a steering wheel of the vehicle. The system includes an electronic power steering system. The electronic power steering system includes a motor configured to cause movement of a road wheel of the vehicle responsive to movement of the steering wheel and a steering system sensor configured to provide an indication of at least one of a steering torque and a steering movement of a component of the electronic power steering system. The system further includes a controller configured to generate a control signal configured to cause the motor to generate a perturbation signal that causes vibration of the steering wheel and to receive a steering signal from the steering system sensor. The controller is further configured to mix the perturbation signal and the steering signal to produce a heterodyne signal and generate a driver contact signal indicative of whether the driver of the vehicle is in contact with the steering wheel of the vehicle, a value of the driver contact signal dependent on characteristics of the heterodyne signal relating to the perturbation signal.

DRAWINGS

Preferred exemplary embodiments will hereinafter be described in conjunction with the appended drawings, wherein like designations denote like elements, and wherein.

DESCRIPTION

The system and method described herein may be used to determine whether a driver of a vehicle is in contact with a steering wheel of the vehicle. In particular, the system and method determine whether a driver is in contact with the steering wheel by inducing a low level vibration in the steering wheel that is undetectable to the driver and detecting a response in a signal generated by an electronic power steering system sensor, but do in such a way that the response can be detected regardless of vehicle operating conditions. In one aspect of the present teachings, the frequency of the signal used to cause the vibration is varied in response to vehicle speed to reduce potential signal noise from other unrelated steering system vibrations. In another aspect of the present teachings, heterodyne detection is employed to accurately identify a response in the steering system sensor signal resulting from driver contact with the steering wheel.

Figure 1:
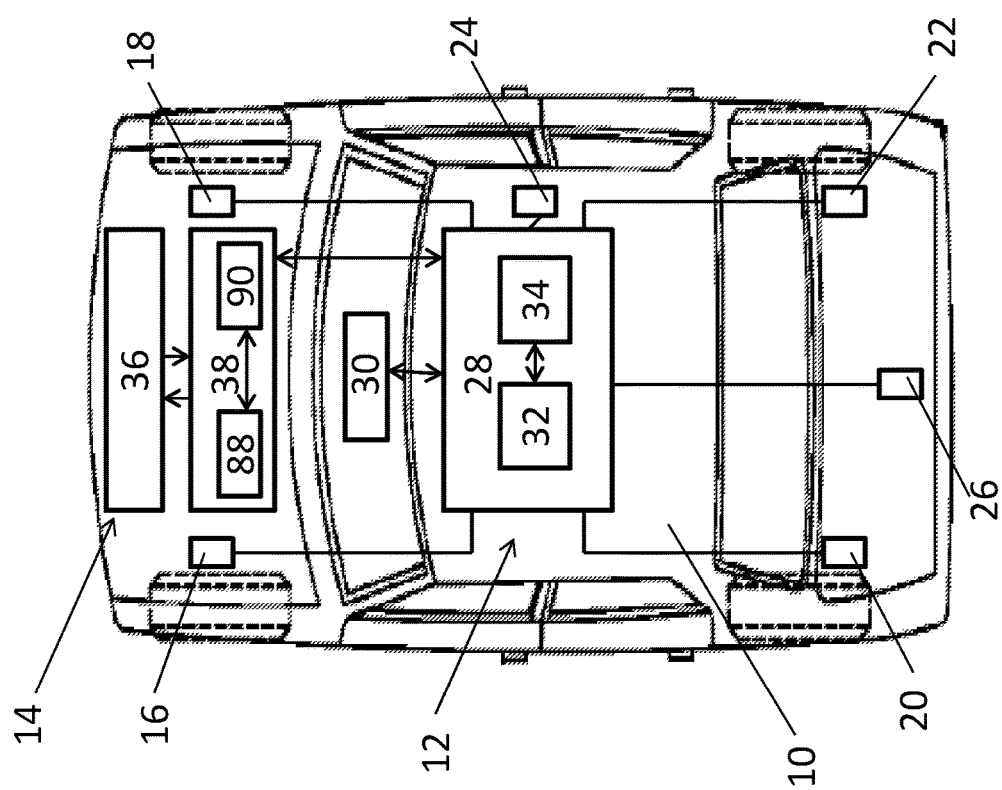
FIG. 1 is a schematic view of an exemplary vehicle including one embodiment of a system for determining whether a driver of a vehicle is in contact with a steering wheel of the vehicle.

Referring now to the drawings wherein like reference numerals are used to identify identical components in the various views, FIG. 1 illustrates one embodiment of a vehicle 10 including a safety system 12 and a system 14 for determining whether a driver of vehicle 10 is in contact with a steering wheel of vehicle 10.

Safety system 12 is provided to detect a condition that creates a risk to vehicle 10 and/or the occupants of vehicle 10 and to alert the occupants to the condition and/or cause the vehicle 10 to act in a manner to reduce or eliminate the risk. In certain embodiments, system 12 comprises an active safety system such as a collision mitigation and avoidance system that detects and attempts to mitigate or avoid collisions with objects external to vehicle 10 such as a forward collision warning system, front automatic braking system (e.g., as part of an adaptive cruise control system or independent thereof), forward or rear park assist system, lane departure warning or lane keeping system, side blind zone alert system, side or rear object detection system, or rear automatic braking system. In other embodiments, system 12 may comprise a passive (non-active) safety system such as a drowsy driver detection system or teen (or inexperienced) driver monitoring system. System 12 may include sensors that detect operating conditions of vehicle 10 such as wheel speed sensors 16, 18, 20, 22, sensors that detect environmental conditions relating to the operating environment of the vehicle such as a temperature or humidity sensor 24, and/or sensors, such as sensor 26, that detect characteristics of objects external to the vehicle (e.g., other vehicles, guardrails, etc.) including the presence or absence of such objects, the position or change in position of such objects, and movements of such objects. System 12 may also include a controller 28 that processes signals generated by sensors 16, 18, 20, 22, 24, 26 and communicates with a user interface 30 to provide warnings to vehicle occupants and with controllers for various vehicle systems—including, for example, an engine controller, brake controller and/or steering controller—to control the operation of such systems in an attempt to mitigate or avoid a safety risk such as a collision. Controller 28 may include a variety of electronic processing devices, memory devices, input/output (I/O) devices, and/or other known components, and may perform various control and/or communication related functions. In an exemplary embodiment, controller 28 includes an electronic memory device 32 that stores various sensor readings (e.g., sensor readings from sensors 16, 18, 20, 22, 24, 26), look up tables or other data structures, software programs, etc. Controller 28 may also include an electronic processing device 34 (e.g., a microprocessor, a microcontroller, an application specific integrated circuit (ASIC), etc.) that executes instructions for software, firmware, programs, algorithms, scripts, etc. that are stored in memory device 32. Controller 28 may be electronically connected to other vehicle devices, modules and systems via a vehicle communications bus or other communication means and can interact with them when required. User interface 30 exchanges information or data with occupants of vehicle 10 and may include any combination of visual, audio, haptic and/or other types of components for doing so.

System 14 is provided to determine whether a driver of vehicle 10 is in contact with a steering wheel of vehicle 10. System 14 may include an electronic power steering system 36 and a controller 38.

Figure 2:
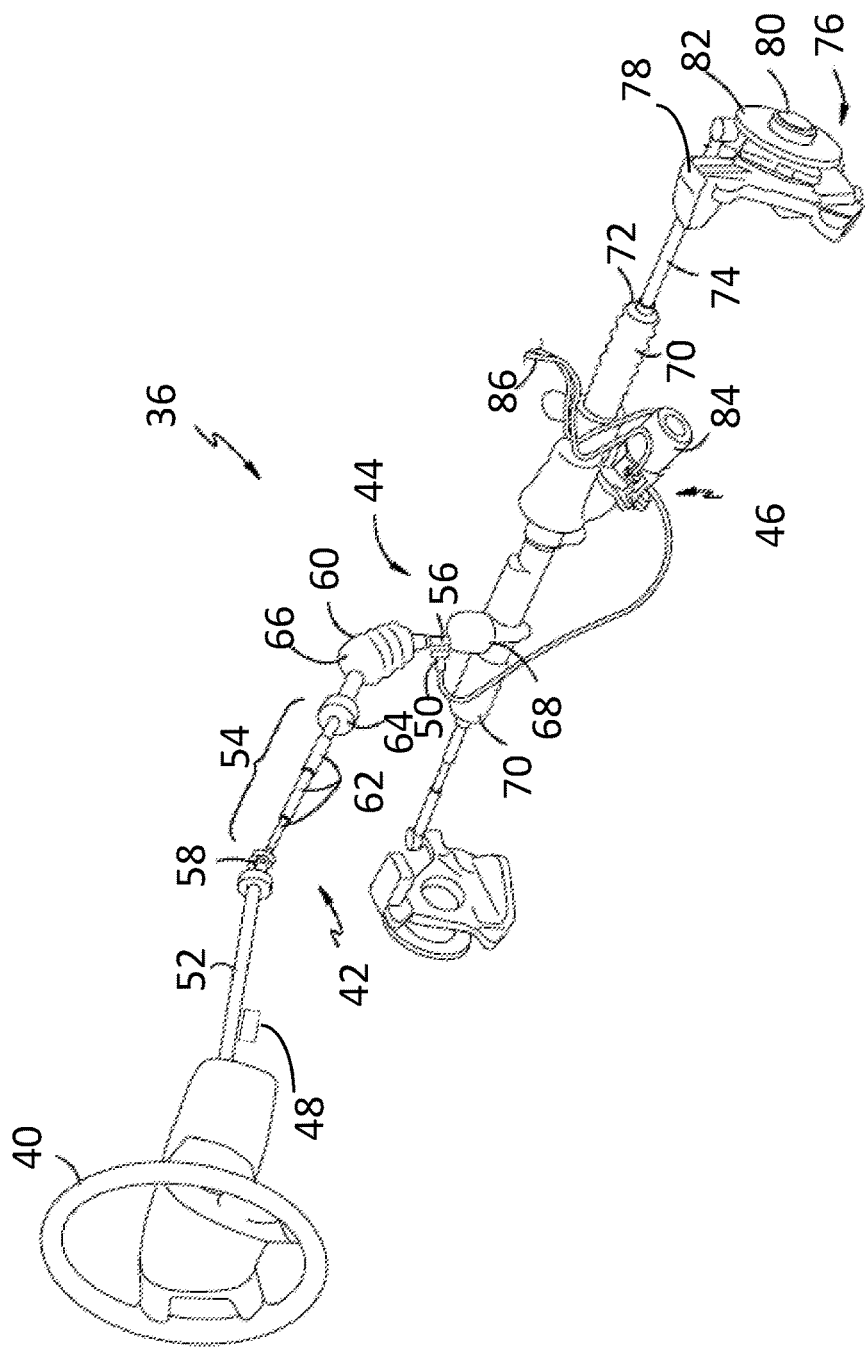
FIG. 2 is a perspective view of an exemplary electronic power steering system that can be used in the vehicle of FIG. 1.

Electronic power steering (EPS) system 36 is provided to assist steering of vehicle 10 by augmenting steering torque provided by the driver of vehicle 10 at the steering wheel. Referring to FIG. 2, EPS system 36 is configured to steer or control the front wheels of vehicle 10 and comprises a "rack-assist" type system (i.e., a system where the output of the EPS motor, through gearing, is coupled to a rack). It should be understood, however, that the present system and method could be used with other types of EPS systems including, but not limited to, "column-assist" and re-circulating ball type systems. EPS system 36 may include a steering wheel 40, a steering column assembly 42, a rack and pinion steering gear assembly 44 a motor assembly 46 and various steering system sensors 48, 50.

Steering wheel 40 is rotatably mounted on steering column assembly 42 and provides a driver with the ability to steer the vehicle, as is widely appreciated in the art. Steering wheels can come in a variety of different forms and can carry additional components like a horn or electronic controls. For example, electronic controls that operate a cruise control system, a vehicle radio, and other known devices could be mounted to one or more branches or a center component of steering wheel 40. For purposes of simplicity, the wiring and different electrical connections that usually accompany a steering wheel and steering column assembly have been removed from FIG. 2.

Steering column assembly 42 rotatably supports steering wheel 40 and transmits the steering intentions of the driver to the other portions of EPS system 36. In the exemplary embodiment shown here, steering column assembly 42 has been stripped of its exterior housing, control stalks, ignition components, etc. in order to reveal first, second, and third steering shafts 52, 54, 56, respectively, connected together by first and second steering joints 58, 60. Each of these exemplary parts are part of steering column assembly 42. First steering shaft 52 is securely fastened to steering wheel 40 at an upper end and is coupled to second steering shaft 54 at a lower end via first steering joint 58. Although a number of different types of joints or connections can be used, first steering joint 58 is shown here as a universal joint (also called a U-joint, Cardan joint, Hardy-Spicer joint, Hooke's joint, etc.). Any type of joint that connects two rigid shafts together around a bend, and is able to transmit rotary motion from one shaft to the other could be used. Second steering shaft 54 acts as an intermediary segment between the first and third steering shafts 52, 56 and is coupled to those shafts via steering joints 58, 60. It is possible for one or more of the steering shafts to include additional features, including a telescoping feature 62 that enables the shaft to extend to different lengths, as well as a flexible coupling 64 for damping vibrations in the steering connection assembly. Second steering joint 60 is shown here encased in a plastic or rubber boot 66 that isolates or otherwise protects the steering joint located beneath. As with the first steering joint, second steering joint 60 can be one of a variety of different forms including a universal or swivel joint type. In this embodiment, third steering shaft 56 is shorter than the other shaft segments and acts as an input shaft to the rack and pinion steering gear assembly 44 (third steering shaft 56 is sometimes considered to be part of rack and pinion steering gear assembly 44, even though its illustratively shown here as part of steering connection assembly 42). It should of course be appreciated that the foregoing description is only of a general and exemplary nature as myriad steering connection assembly embodiments, including those having more, less and/or different components than that shown here, could also be used.

Rack and pinion steering gear assembly 44 converts rotational motion in steering column assembly 42 into lateral or cross-vehicle motion that can be used to turn the vehicle's wheels. According to the embodiment shown in FIG. 2, a housing 68 encloses a cylindrical pinion gear, an elongated rack, one or more sets of bearings and other components widely known in the art (none of which are shown here). The pinion gear is arranged in a generally coaxial manner with third steering shaft 56 and includes geared teeth on its outer circumferential surface. The elongated rack is arranged according to a cross-vehicle orientation (i.e., the rack extends in the lateral direction of the vehicle) and has corresponding geared teeth to meshingly engage those of the pinion gear. Bearings and other components can be used to ensure smooth movement during operation. In this embodiment, flexible boots 70 are used to surround the sections of the rack that protrude from housing 68; this helps to ensure that the rack and pinion steering gear assembly is maintained free from dirt and debris. Each of the two ends of the rack (shown here inside of boot 70) connects to a rack joint 72, which can be a spherical or other omni-directional connection coupled to a tie rod assembly 74. Assembly 74 connects rack and pinion steering gear assembly 44 to a wheel assembly 76 or "corner" of vehicle 10 so that lateral motion in the rack can be coupled to the wheels to cause the wheels to turn. In particular, assembly 74 may be coupled to a steering knuckle 78 of wheel assembly 76 which is in turn coupled to a rotatable hub 80, a disc or rotor 82, and a wheel with an installed tire (not shown).

Motor assembly 46 provides the system with power assist in order to supplement the manual steering force generated by the driver. This makes steering easier and more effortless. According to this particular embodiment, motor assembly 46 includes an electric motor 84, a power input 86 and one or more gears, pulleys, belts, bearings, etc. for achieving preferred ratios of motor armature to rack velocities. Electric motor 84, which can be a brushless motor, brushed motor, or any other type of motor employed in the art, includes a motor output that can be mechanically coupled to the rack via a speed reduction mechanism (the motor generally rotates at too great of a rotational velocity for the rack, thus, it needs to be geared down). The electric motor can be powered via power input 86 so that it drives the rack in a lateral or cross-vehicle motion (the direction and speed is dependent on the motor control signals, as will be explained), which provides assistance for turning the wheels in addition to other functions.

Steering systems sensors 48, 50 generate signals indicative of a steering torque and steering movements for components of EPS system 36. The same signals can also provide information on vibrations in steering column assembly 42 resulting from smooth road shake (SRS) or attempts to attenuate SRS and, as discussed in greater detail below, vibrations induced to determine whether the driver is contact with steering wheel 40. Sensor 48 may comprise a steering angle sensor and generates a signal indicative of the degree of rotation of steering wheel 40 and/or one of the steering shafts 52, 54, 56 of steering column assembly 42. In addition to, or as an alternative to, measuring the degree of rotation of steering wheel 40, sensors may be used to detect other movements of components within EPS system 36 indicative of movement of the steering wheel 40 including, for example, a position of motor 84 or a translation of the rack. Sensor 50 may comprise a steering torque sensor and generates a signal indicative of the amount of torque applied to the steering wheel 40 and/or one of the steering shafts 52, 54, 56 of steering column assembly 42. Sensor 50 measures torque as a function of time so that changes due to periodic and/or aperiodic vibrations can be recorded for analysis. Some examples of suitable torque sensors include magnetostrictive-type sensors, rotational displacement-type sensors (e.g., sensors that measure a relative angular displacement with potentiometric devices or the like), and strain gauge-type sensors, to name but a few. In the illustrated embodiment, sensor 50 is mounted on or near steering shaft 56. It should be understood that the locations of sensors 48, 50 may vary along steering column assembly 42. In addition to steering angle sensors 48 and steering torque sensors 50, it should be understood that other types of steering system sensors could be used herein including, for example, an accelerometer (the displacement, velocity, and/or acceleration of a steering connection assembly component could be related to vibrations in the assembly). These sensors may be collectively referred to as motion sensors. Further, it should be understood that system 14 may further include contact sensors (not shown) including pressure sensors and capacitive sensors that are configured to generate an output signal indicative of driver contact with steering wheel 40.

During a conventional forward-driven operation, a driver exerts a rotational force on steering wheel 40 in order to turn it in a clockwise or counter-clockwise direction. The rotational force exerted by the driver and/or the degree of rotation caused by the driver are converted into a steering torque and possibly a responsive steer angle, respectively, that are transmitted throughout the length of steering column assembly 42. The steering angle and steering torque can be sensed by sensors 48, 50 and corresponding signals are sent to an electronic controller such as controller 38. The rotational motion of the various shafts, joints, etc. of steering column assembly 42 is converted into a lateral or side-to-side motion in rack and pinion steering gear assembly 44. This conversion takes place between the pinion gear and the geared rack component, as is widely known in the art, and translates into lateral motion of tie rod assembly 74. The movement of the tie rod assembly causes the wheel assemblies 76 to pivot or rotate in correspondence, which causes the vehicle's wheels to turn. In addition to this manual operation, motor assembly 46 also provides the driver with power assistance. Controller 38 can use the output of sensors 48, 50, a vehicle speed signal, and other inputs to generate a motor control signal that drives electric motor 84 in a certain direction, at a certain speed, for a certain amount of time. Mechanical output from electric motor 84 can be geared down through one or more components like pulleys, belts, gears, etc., and is converted into lateral motion that can be mechanically coupled to the rack. Thus, the total forces at the rack include the manual contributions from the driver and the electric contributions from electric motor 84. As previously mentioned, this is a so-called 'rack-assist' system because the output of electric motor 84 is mechanically coupled to the rack, however, other systems such as a 'column-assist' system could be used as well. In a column-assist system, the output of the motor is coupled to a component of steering column assembly 42, such as first steering shaft 52.

Referring again to FIG. 1, controller 38 may be provided to control electric motor 84 in EPS system 36. In accordance with one aspect of the present teachings, controller 38 is also provided to determine, responsive to signals from sensors 48, 50, whether a driver of vehicle 10 is in contact with steering wheel 40 and to generate a driver contact signal indicative of whether the driver is in contact with steering wheel 40. Controller 38 may include a variety of electronic processing devices, memory devices, input/output (I/O) devices, and/or other known components, and may perform various control and/or communication related functions. In an exemplary embodiment, controller 38 includes an electronic memory device 88 that stores various sensor readings (e.g., sensor readings from sensors 48, 50), look up tables or other data structures, software programs, etc. Controller 38 may also include an electronic processing device 90 (e.g., a microprocessor, a microcontroller, an application specific integrated circuit (ASIC), etc.) that executes instructions for software, firmware, programs, algorithms, scripts, etc. that are stored in memory device 88. Depending on the particular embodiment, controller 38 may be a stand-alone vehicle electronic module, it may be incorporated or included within another vehicle electronic module, or it may be part of a larger network or system. Controller 38 may be electronically connected to other vehicle devices, modules and systems via a vehicle communications bus or other communication means and can interact with them when required.

Figure 3:
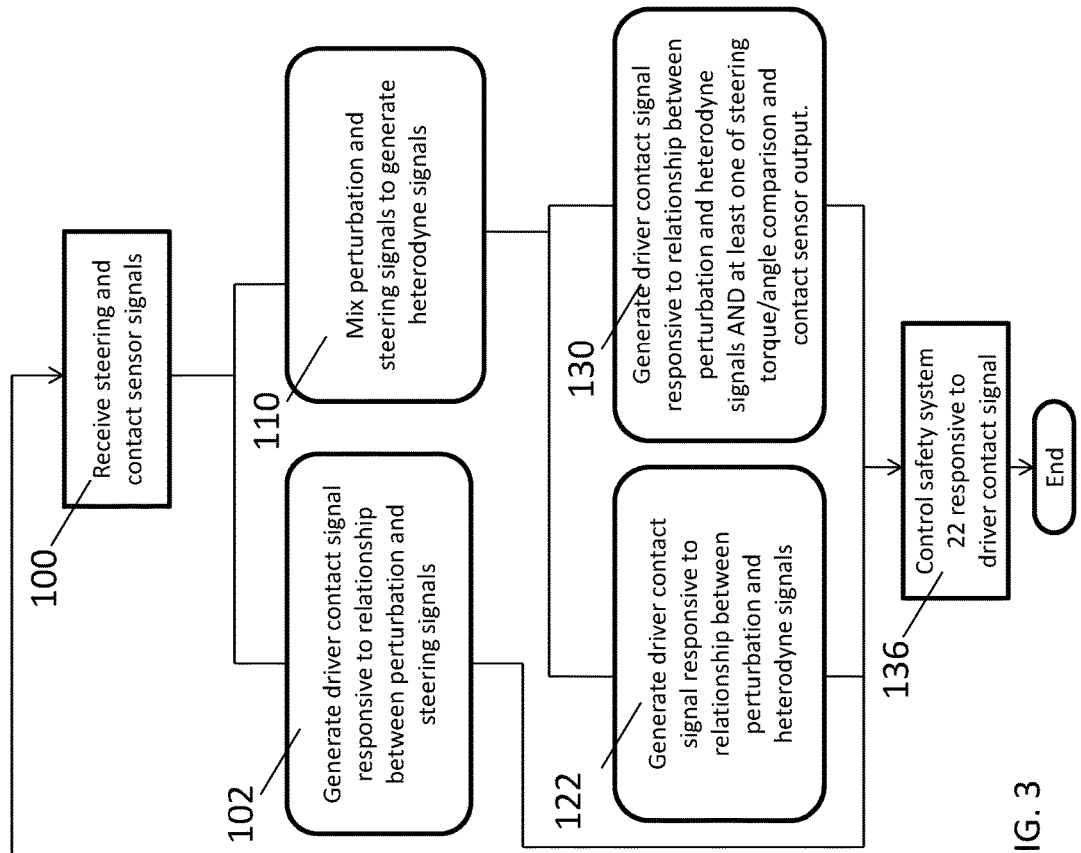
FIG. 3 is a flowchart illustrating embodiments of a method for determining whether a driver of a vehicle is in contact with a steering wheel of the vehicle.
Figure 3:
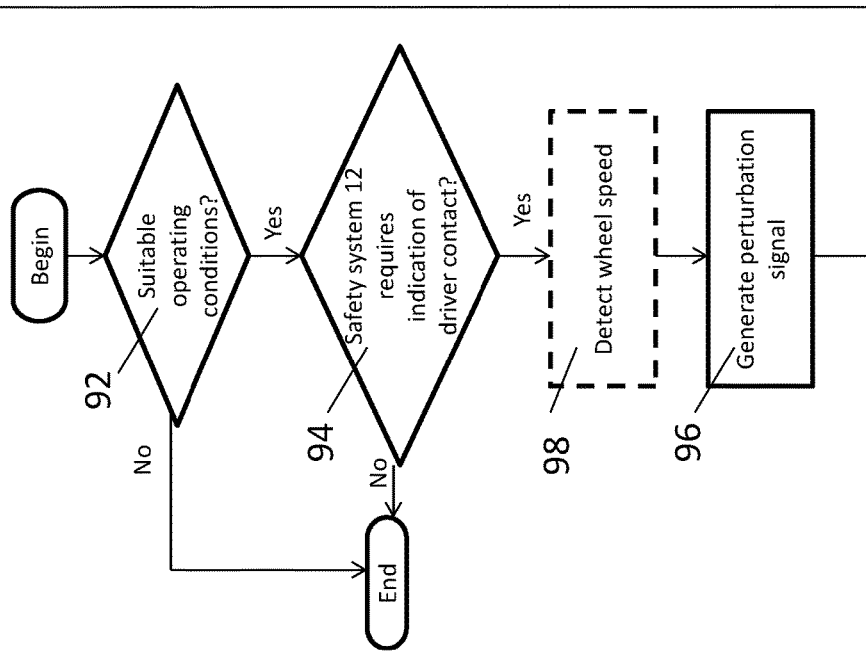

In accordance with various embodiments disclosed herein, controller 38 is configured with appropriate programming instructions or code (i.e., software) to perform several steps in a method for determining whether a driver of vehicle 10 is in contact with the steering wheel 40 of vehicle 10. The code may be stored in memory device 88 of controller 38 and may be uploaded to memory device 88 from, a conventional computer storage medium. Referring now to FIG. 3, the method may begin with one more steps intended to evaluate one or more potential preconditions to performing subsequent steps in the method. In some circumstances, a lack of contact with the steering wheel 40 by the driver may not create a significant risk requiring assessment of whether the driver is in contact with steering wheel 40. For example, a lack of contact with the steering wheel 40 may only be a concern during certain operating conditions of the vehicle. Therefore, the method may begin with the step 92 of determining whether certain operating conditions exist. In accordance with one embodiment, these operating conditions may include whether or not the vehicle is in a suitable operating condition (e.g., non-stationary). The method may also include the step 94 of determining whether a safety system requires an indication regarding driver contact with steering wheel 40. Information regarding contact with steering wheel 40 may be relevant to some safety systems 12 and not others. Further, information regarding driver contact with steering wheel 40 may be needed by a safety system 12 under certain conditions and not others. Therefore, controller 38 may be configured to receive a driver contact request signal—either directly from a safety system 12 or from a supervisory controller—and to determine, responsive to that signal, if the system 12 requires an assessment of whether the driver is contact with steering wheel 40. If no systems 12 require information on driver contact with the steering wheel 40 (and no other operating conditions exist that require information on driver contact with the steering wheel 40), the method may terminate. If one or more systems 12 require information on driver contact with the steering wheel 40 (or other operating conditions exist that require information on driver contact with the steering wheel 40), the method may proceed.

If circumstances indicate that it is desirable to determine and/or verify whether the driver is in contact with steering wheel 40, the method may continue with various steps to induce a vibration in steering wheel 40 and measure the response. In particular, the method may include the step 96 of generating a perturbation signal that causes vibration of the steering wheel. In conventional systems that employ steering wheel vibration to determine contact with the steering wheel, the induced vibration can be confounded by other efforts to reduce vibration resulting from "smooth road shake" caused by tire/wheel imbalance, tire irregularities, brake rotor imbalance and similar issues. Therefore, in accordance with some embodiments of the present teachings, the frequency of the perturbation signal is varied in response to vehicle speed in order to make the signal immune to unrelated vibrations such as periodic vibrations arising from internal excitation or through efforts to actively attenuate these vibrations. In this embodiment, step 96 may be preceded by the step 98 of determining a speed of a wheel of the vehicle 10. The perturbation signal is then formed with a frequency that is responsive to the speed of the wheel of vehicle 10. In particular, because the frequency of the periodic vibrations referenced above is generally linearly dependent on vehicle speed, the perturbation signal can be formed in a way that avoids these frequencies. The speed of the wheel can be determined in a conventional manner from one or both of wheel speed sensors 16, 18. Controller 38 can then form a control signal configured to cause motor 84 of EPS system 36 to generate a perturbation signal with a frequency that is responsive to the wheel speed through, for example, use of a mathematical formula or a look up table in memory device 88.

The method may continue with the step 100 of receiving steering signals from steering system sensor 48, 50 that are configured to provide indications of at least one of the steering torque and steering movement of a component of EPS system 36. Sensors 48, 50 generate signals that are indicative of steering movement and steering torque, but these signals are influenced by forces imparted by the driver to the steering wheel, forces imparted by the motor 84, resistance of the tires of the vehicle to turning and variation in the road surface. Therefore, the steering signals include information resulting from generation of the perturbation signal by motor 84. Controller 38 is configured to receive the steering signals and to process the signals to obtain information indicative of whether the driver is contact with the steering wheel 40. Although some subsequent steps in the method will be described with reference to actions performed on a single steering signal, it should be understood that similar actions may be performed on steering signals generated from multiple steering system sensors 48, 50 and the assessment of whether the driver is contact with steering wheel 40 may be made in response to the output of more than one steering system sensor 48, 50. In some embodiments of the invention, controller 38 may also receive output signals in step 100 from contact sensors such as pressure sensors or capacitive sensors for a purpose described hereinbelow.

In accordance with one embodiment, the method may proceed directly to the step 102 of generating a driver contact signal that is indicative of whether the driver of the vehicle 10 is in contact with the steering wheel 40 of the vehicle 10. In this embodiment, the value of the driver contact signal is dependent on characteristics of the steering signal relating to the perturbation signal. As discussed above, it is known to introduce a vibration in the steering wheel and measure the response as an indicator of driver contact with the steering wheel 40. If a driver is in contact with the steering wheel 40, the force imparted by the driver will cause a first change from the perturbation signal that can be detected in the steering signals generated by sensors 48, 50. Conversely, if the driver is not in contact with the steering wheel 40, the steering signals will have a component having characteristics (e.g., an amplitude or phase) that indicate a second change from the original perturbation signal. In conventional systems that employ steering wheel vibration to determine contact with the steering wheel, the induced vibration can be attenuated by other efforts to reduce vibration resulting from "smooth road shake" caused by tire/wheel imbalance, tire irregularities, brake rotor imbalance and similar issues. By determining the speed of the vehicle wheels in step 98 and varying the frequency of the perturbation signal in response to vehicle speed in step 96, the disclosed system and method avoid attenuation of the signal and will be sufficient in some circumstances to provide a reliable indicator of contact between the driver and steering wheel 40.

Figure 4:
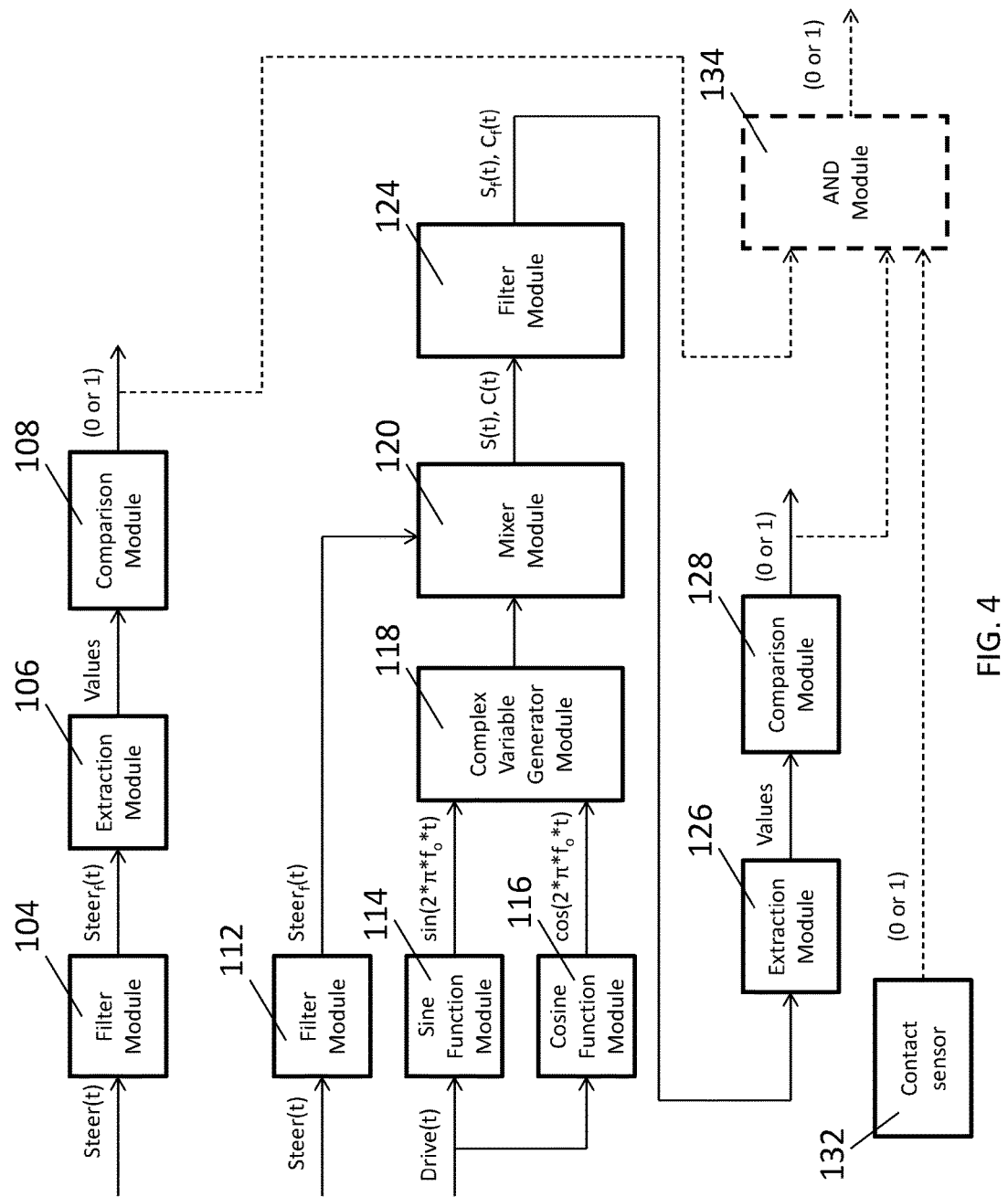
FIG. 4 is a schematic diagram illustrating the processing of certain signals in the system of FIG. 1 when implementing the methods of FIG. 3.

Referring to FIG. 4, step 102 may include several processing substeps leading from receipt of the steering signal to generation of the driver contact signal. A steering signal steer(t) generated by at least one of sensors 48, 50 and indicative of a steering movement (such as a steering angle) or steering torque may first be passed through a filter module 104 to generate a filtered signal steer$_f$(t). In one embodiment, the filter is constructed as a lowpass filter and, in particular, a third order Butterworth lowpass filter to permit passage of signals having frequencies on the order of about 0.25 Hz. An extraction module 106 extracts a plurality of values from the filtered steering signal steer$_f$(t) over a defined time period (e.g., at 10 ms intervals over a time period of about 1.5 seconds). The extraction module 106 may obtain values from the signal steer$_f$(t) by taking the absolute value of the amplitude of the signal at individual points in time. A comparison module 108 compares the values obtained from the filtered signal steer$_f$(t) to a predetermined threshold steering movement or steering torque values. The threshold values are indicative of whether the driver is contact with the steering wheel 40. In accordance with one aspect of the present teachings, the threshold values may be formed as a function of the frequency of the perturbation signal. If all of the steering movement and/or steering torque values obtained from the filtered steering system signal steer$_f$(t) meet a predetermined condition relative to the threshold (e.g., are less than or equal to the threshold steering movement and/or steering torque), the comparison module generates a comparison signal having one value. If one or more of the values from the filtered steering system signal steer$_f$(t) does not meet the predetermined condition relative to the threshold (e.g., one or more values are greater than the threshold steering movement and/or steering torque), the comparison module 108 generates a comparison signal having another value. The value (e.g., a 0 or 1) of the output of comparison module 108 is indicative of whether the driver is contact with the steering wheel 40 and may comprise the driver contact signal in certain embodiments.

Referring again to FIG. 3, in accordance with other embodiments of the present teachings, additional or alternative steps are performed to determine whether the driver is contact with steering wheel 40. In these embodiments, the method may continue with the step 110 of mixing the perturbation signal and the first steering signal to produce one or more heterodyne signals. In accordance with one aspect of the present teachings, a heterodyne detection mechanism is applied to the steering signal in order to analyze the signal to determine whether the driver is contact with the steering wheel 40. The use of heterodyne detection allows the use of a perturbation signal that introduces a relatively low level vibration in steering wheel 40. As discussed hereinabove, significant vibration of the steering wheel is undesirable because it is detectable by the driver and creates an unwanted distraction. Previously, when inducing low level vibrations, it has been difficult to identify a response that is dictated by the presence or absence of contact between the driver and steering wheel 40 as opposed to other factors. The use of a heterodyne detection method in accordance with the present teachings, however, enables the use of a low level vibration while permitting reliable determinations regarding contact between the driver and steering wheel 40.

Referring again to FIG. 4, step 110 may include a number of processing operations on both the steering signal steer(t) and the perturbation signal drive(t) before the signals are mixed. The steering signal steer(t) may pass through a filter module 112 to generate a filtered signal steer$_f$(t). In one embodiment, the filter is constructed as a bandpass filter and, in particular, a second order Butterworth bandpass filter to permit passage of signals having frequencies of plus or minus 2 Hz relative to the frequency of the perturbation signal. The perturbation signal drive(t) is input to sine-function and cosine-function generator modules 114, 116. Module 114 receives the perturbation signal drive(t) and generates a sine-function carrier signal $\sin(2*\pi*f_o*t)$ at the frequency of the perturbation signal drive(t). Similarly, module 116 receives the perturbation signal drive(t) and generates a cosine-function carrier signal $\cos(2*\pi*f_o*t)$ at the frequency of the perturbation signal drive(t). The cosine-function carrier signal $\cos(2*\pi*f_o*t)$ is 90 degrees out of phase with respect to the sine-function carrier signal $\sin(2*\pi*f_o*t)$. The sine-function carrier signal $\sin(2*\pi*f_o*t)$ and cosine-function carrier signal $\cos(2*\pi*f_o*t)$ are a set of coincident and quadrature generators (i.e., arbitrarily referenced in-phase and out-of-phase wave generators at the frequency of the perturbation signal drive(t)). Although, the cosine-carrier carrier signal $\cos(2*\pi*f_o*t)$ is 90 degrees out of phase with respect to the sine-function carrier signal $\sin(2*\pi*f_o*t)$ in the described embodiment, it should be understood that any equivalent coincident and quadrature wave generators could be employed (including those with phase differences that are other than 90 degrees and those with redundant components at multiple phases). The steering signal steer(t) has periodic content at the frequency of the carrier signals $\sin(2*\pi*f_o*t)$ and $\cos(2*\pi*f_o*t)$. However, the amplitude of the periodic content of the steering signal steer(t) and the phase offset between the steering signal steer(t) and the carrier signals $\sin(2*\pi*f_o*t)$ and $\cos(2*\pi*f_o*t)$ are unknown. The carrier signals $\sin(2*\pi*f_o*t)$ and $\cos(2*\pi*f_o*t)$ may be provided to a complex variable generator module 118 that forms a complex variable including both real (cosine) and imaginary (sine) components. Following these actions a mixer module 120 mixes (e.g., by taking the product of) the filtered steering signal steer$_f$(t) and the sine-function carrier signal $\sin(2*\pi*f_o*t)$ to generate a heterodyne signal in the form of a mixed sine signal $S(t)=\text{steer}_f(t)*\sin(2*\pi*f_o*t)$ that relates to the mixed quadrature component of the perturbation signal. Similarly, mixer module 120 (or another mixer module) mixes (e.g., by taking the product of) the filtered steering signal steer$_f$(t) and the cosine-function carrier signal $\cos(2*\pi*f_o*t)$ to generate a heterodyne signal in the form of a mixed cosine signal $C(t)=steer_f(t)*\cos(2*\pi*f_o*t)$ that relates to the mixed coincident component of the perturbation signal.

Referring again to FIG. 3, the method may continue with the step 122 of generating a driver contact signal, responsive to the heterodyne signal, indicative of whether the driver of the vehicle 10 is in contact with the steering wheel 40 of the vehicle 10. Step 122 may include a series of substeps that interpret the heterodyne signal by extracting components that relate to the perturbation signal and then establish a value for the driver contact signal that is dependent on the characteristics (e.g., amplitude and phases) of these related components. Heterodyne detection is a process of detecting a signal related to a base signal such as the perturbation signal by mixing the signal with a reference signal (a local oscillator operating at a selected frequency) to generate a heterodyne signal. The heterodyne signal includes a component having a relative amplitude and phase that is related to the perturbation signal. If at least one of the amplitude ratio or phase differs from predetermined thresholds (or differs significantly depending on the threshold used), the heterodyne signal indicates that the steering signal has been influenced by another termination condition (e.g., impedance loading or effective dynamic termination, or lack thereof, of the steering wheel 40) and, in particular, by driver contact with the steering wheel 40. If both the relative amplitude and phase are with ranges of the thresholds (depending again on the respective thresholds used), the heterodyne signal indicates that the steering signal is consistent with a particular termination condition and, in particular, that the driver is not in contact with the steering wheel 40.

Referring again to FIG. 4, the heterodyne or mixed sine and cosine signals S(t) and C(t) may pass through a filter module 124 to generated filtered sine and cosine signals $S_f(t)$ and $C_f(t)$. In one embodiment, the filter is constructed as a low-pass filter and, in particular, a third order Butterworth lowpass filter. An extraction module 126 extracts a plurality of values from the filtered sine and cosine signals $S_f(t)$ and $C_f(t)$ over a defined time period (e.g., about 1.5 seconds). In one embodiment, the extraction module 126 seeks to obtain values corresponding to the amplitude of the complex quantity represented by the filtered sine and cosine signals $S_f(t)$ and $C_f(t)$. The extraction module 126 may, therefore, obtain values from the signals by taking the square root of the sum of the squares at individual points in time (i.e., $\sqrt{C_f(t)^2+S_f(t)^2}$) or the maximum of the absolute value of the real and imaginary portions of the complex quantity. In another embodiment, the extraction module 126 seeks to obtain values corresponding to the phase of the filtered sine and cosine signals $S_f(t)$ and $C_f(t)$ by comparing their relative amplitudes. A comparison module 128 compares the values obtained from the heterodyne signal (e.g., the amplitudes or the phases) to one or more predetermined threshold values. The threshold values are indicative of whether the driver is in contact with the steering wheel 40. In accordance with one aspect of the present teachings, the threshold values may be formed as a function of the frequency of the perturbation signal. The functional relationship between the values and the perturbation signal may be determined empirically using exemplary vehicles. In the embodiment where the extraction module 126 obtains values corresponding to the amplitude of the complex quantity, the values are compared to a single threshold value. If all of the values obtained from the heterodyne signal meet a predetermined condition relative to the threshold (e.g., are less than or equal to the threshold), the comparison module 128 outputs one value. If one or more of the values from the heterodyne signal does not meet the predetermined condition relative to the threshold (e.g., one or more values are greater than the threshold), the comparison module 128 outputs another value. In the embodiment where the extra extraction module 126 obtains values corresponding to the phase of the complex quantity, the values are compared to multiple threshold values. If all of the values obtained from the heterodyne signal meet a predetermined condition relative to the thresholds values (e.g., are greater than or equal to a first threshold value, but less than or equal to a second, greater, threshold value), the comparison module 128 outputs one value. If one or more of the values from the heterodyne signal does not meet the predetermined conditions relative to the threshold values (e.g., one or more values is less than the first threshold value or greater than the second threshold value), the comparison module 128 outputs another value. The value (e.g., a 0 or 1) of the output of comparison module 128 is indicative of whether the driver is contact with the steering wheel 40 and may comprise the driver contact signal in certain embodiments.

Referring again to FIG. 3, still other embodiments of methods in accordance with the present teachings may include the step 130 of generating a driver contact signal in response to both the heterodyne signal and at least one of (i) a comparison signal output by control logic that compares steering torque and/or steering movement measurements to thresholds indicative of whether the driver is in contact with steering wheel 40 and (ii) an output signal of a contact sensor 132 such as a pressure sensor or capacitive sensor that is indicative of whether the driver is in contact with steering wheel 40. As discussed hereinabove, it is known to use measurements of steering torque and/or steering angle or other steering movements and/or to use contact sensors as indicators of the presence or absence of contact with the steering wheel. These measurements, however, are not always a reliable indicator. For example, steering torque and movement sensors may not generate accurate readings during straight line driving while contact sensors may not detect contact with certain parts of the steering wheel. Therefore, in accordance with some embodiments, the heterodyne detection method described hereinabove is used in combination with comparisons of (i) steering torque and/or steering angle or other steering movements against threshold values and/or (ii) output signals from contact sensors 132 to provide increased confidence to indications that the driver is not in contact with the steering wheel 40. Referring again to FIG. 4, in one such embodiment, an AND logic module 134 may receive the outputs of both of comparison modules 128 and at least one of comparison module 108 and contact sensor 132. The driver contact signal may assume a first value indicative of a lack of contact by the driver with the steering wheel 40 only when the output of the comparison module 128 and the output of at least one (or in certain embodiments both) of comparison module 108 and contact sensor 132 indicate a lack of contact and a second value indicative of contact when one of the outputs of the comparison modules 108, 128 and contact sensor 132 indicate contact. It should be noted that the heterodyne signal and the outputs of the comparison modules 108, 128 are generated in parallel using the same output steer(t) of a steering sensor 48, 50 (i.e., over the same defined time period). In accordance with certain embodiments of the invention, an output value indicating a lack of contact by the driver with the steering wheel may lead to a repetition of certain steps in the method. In particular, if the output indicates a lack of contact, a new perturbation signal can be generated that induces a more significant vibration in steering wheel 40 and the above-described process steps repeated to obtain a new output indicative of driver contact. The more significant vibration enables increased accuracy in detecting the signal, but without disturbing the driver who is presumably not in contact with the steering wheel 40 based on the initial output. This process can be repeated over and over with new perturbation signals inducing ever stronger vibrations in steering wheel 40 until an acceptable level of confidence is obtained that the driver is, in fact, not in contact with steering wheel 40.

Referring again to FIG. 3, the driver contact signal may be used for a variety of purposes. In accordance with certain embodiments, the method may include the step 136 of controlling a safety system 12 of vehicle 10 responsive to the driver contact signal. As discussed hereinabove, certain safety systems 12 such as adaptive cruise control or lane keep assist may require driver contact with the steering wheel 40 before use. Therefore, controller 38 may provide the driver contact signal to one or more safety systems 12 for the purpose of enabling systems 12, assisting systems 12 in determining whether to generate warnings, or implementing various responses depending on the nature of system 12.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for determining whether a driver of a vehicle is in contact with a steering wheel of the vehicle, comprising the steps of:
   generating a perturbation signal that causes vibration of the steering wheel;
   receiving a first steering signal from a first steering system sensor configured to provide an indication of at least one of a steering torque and a first steering movement of a first component of an electronic power steering system of the vehicle;
   mixing the perturbation signal and the first steering signal to produce a first heterodyne signal; and,
   generating a driver contact signal indicative of whether the driver of the vehicle is in contact with the steering wheel of the vehicle, a value of the driver contact signal dependent on characteristics of the first heterodyne signal relating to the perturbation signal.

2. The method of claim 1, further comprising the step of determining a speed of a road wheel of the vehicle and wherein a frequency of the perturbation signal is responsive to the speed of the road wheel of the vehicle.

3. The method of claim 1, wherein the step of generating the perturbation signal includes the substep of generating a control signal configured to cause a motor of the electronic power steering system of the vehicle to generate the perturbation signal.

4. The method of claim 1, wherein the step of generating the perturbation signal includes the substeps of:
   receiving a driver contact request signal supporting a safety system of the vehicle; and,
   generating a control signal configured to cause a motor of the electronic power steering system of the vehicle to generate the perturbation signal responsive to the driver contact request signal.

5. The method of claim 1, wherein the step of generating the driver contact signal includes the substeps of:
   comparing a value obtained from the first heterodyne signal to a predetermined threshold; and,
   setting the value of the driver contact signal responsive to whether the value meets a predetermined condition relative to the predetermined threshold.

6. The method of claim 5, wherein a value of the predetermined threshold is a function of a frequency of the perturbation signal.

7. The method of claim 1, wherein the step of generating the driver contact signal includes the substeps of:
   comparing the at least one of the steering torque and the first steering movement to a corresponding one of a predetermined threshold steering torque and predetermined threshold movement; and,
   generating a comparison signal if the at least one of the steering torque and the first steering movement meets a predetermined condition relative to the corresponding one of the predetermined threshold steering torque and predetermined threshold steering movement,
   wherein the driver contact signal is generated responsive to the first heterodyne signal and the comparison signal.

8. The method of claim 7, wherein the driver contact signal indicates that the driver is not in contact with the steering wheel of the vehicle if the characteristics of the first heterodyne signal and the comparison signal indicate that the at least one of the steering torque and the steering movement exceeds the corresponding one of a predetermined threshold steering torque and predetermined threshold steering movement.

9. The method of claim 1, wherein the step of generating the driver contact signal includes the substep of receiving an output signal from a driver contact sensor, wherein the driver contact signal is generated responsive to the first heterodyne signal and the output signal.

10. The method of claim 1 wherein the characteristics of the first heterodyne signal include at least one of an amplitude and a phase of a component of the first heterodyne signal.

11. The method of claim 1, further comprising the step of controlling a safety system of the vehicle responsive to the driver contact signal.

12. The method of claim 1, further comprising the steps of:

receiving a second steering signal from a second steering system sensor configured to provide an indication of at least one of the steering torque, the first steering movement of the first component of an electronic power steering system of the vehicle and a second steering movement of a second component of the electronic power steering system of the vehicle;

mixing the perturbation signal and the second steering signal to produce a second heterodyne signal; and, generating a driver contact signal indicative of whether the driver of the vehicle is in contact with the steering wheel of the vehicle, a value of the driver contact signal dependent on characteristics of the first and second heterodyne signals relating to the perturbation signal.

13. A method for determining whether a driver of a vehicle is in contact with a steering wheel of the vehicle, comprising the steps of:

determining a speed of a road wheel of the vehicle;

generating a perturbation signal that causes vibration of the steering wheel, a frequency of the perturbation signal responsive to the speed of the road wheel of the vehicle;

receiving a first steering signal from a first steering system sensor configured to provide an indication of at least one of a steering torque and a steering movement of a component of an electronic power steering system of the vehicle; and, generating a driver contact signal indicative of whether the driver of the vehicle is in contact with the steering wheel of the vehicle, a value of the driver contact signal dependent on characteristics of the first steering signal relating to the perturbation signal.

14. The method of claim 13, wherein the step of generating the perturbation signal includes the substep of generating a control signal configured to cause a motor of the electronic power steering system of the vehicle to generate the perturbation signal.

15. The method of claim 13, wherein the step of generating the perturbation signal includes the substeps of:

receiving a driver contact request signal supporting a safety system of the vehicle; and, generating a control signal configured to cause a motor of the electronic power steering system of the vehicle to generate the perturbation signal responsive to the driver contact request signal.

16. The method of claim 13, further comprising the step of controlling a safety system of the vehicle responsive to the driver contact signal.

17. A system for determining whether a driver of a vehicle is in contact with a steering wheel of the vehicle, comprising:

an electronic power steering system including a motor configured to cause movement of a road wheel of the vehicle responsive to movement of the steering wheel, and a first steering system sensor configured to provide an indication of at least one of a steering torque and a first steering movement of a first component of the electronic power steering system; and, a controller configured to generate a control signal configured to cause the motor to generate a perturbation signal that causes vibration of the steering wheel;

receive a first steering signal from the first steering system sensor;

mix the perturbation signal and the steering signal to produce a first heterodyne signal; and, generate a driver contact signal indicative of whether the driver of the vehicle is in contact with the steering wheel of the vehicle, a value of the driver contact signal dependent on characteristics of the first heterodyne signal relating to the perturbation signal.

18. The system of claim 17 wherein the controller is further configured to determine a speed of the road wheel of the vehicle and a frequency of the perturbation signal is responsive to the speed of the road wheel of the vehicle.

19. The system of claim 17 wherein the controller is further configured, in generating the perturbation signal, to generate a control signal configured to cause the motor to generate the perturbation signal.

20. The system of claim 17 wherein the controller is further configured to:

compare the at least one of the steering torque and the first steering movement to a corresponding one of a predetermined threshold steering torque and predetermined threshold steering movement; and, generate a comparison signal if the at least one of the steering torque and the first steering movement meets a predetermined condition relative to the corresponding one of the predetermined threshold steering torque and predetermined threshold steering movement, wherein the driver contact signal is generated responsive to the first heterodyne signal and the comparison signal.

21. The system of claim 17, wherein the controller is further configured to receive an output signal from a driver contact sensor and wherein the driver contact signal is generated responsive to the first heterodyne signal and the output signal.

22. The system of claim 17 wherein the characteristics of the first heterodyne signal include at least one of an amplitude and a phase of a component of the first heterodyne signal.

23. The system of claim 17 wherein the controller is further configured to generate a control signal configured to control a safety system of the vehicle responsive to the driver contact signal.

24. The system of claim 17 wherein the electronic power steering system further includes a second steering system sensor configured to provide an indication of at least one the steering torque, the first steering movement of the first component of the electronic power steering system and a second steering movement of a second component of the electronic power steering system and wherein the controller is further configured to receive a second steering signal from the second steering system sensor;

mixing the perturbation signal and the second steering signal to produce a second heterodyne signal; and, generate a driver contact signal indicative of whether the driver of the vehicle is in contact with the steering wheel of the vehicle, a value of the driver contact signal dependent on characteristics of the first and second heterodyne signals relating to the perturbation signal.

* * * * *